United States Defensive Publication [19] (H) [11] T958,002

Cates [43] May 3, 1977

[54] MILK CARTON PAPERBOARD

[75] Inventor: Robert Eugene Cates, New Castle County, Del.

[73] Assignee: Hercules Incorporated, Wilmington, Del.

[21] Appl. No.: 734,843

[22] Filed: Oct. 22, 1976

[51] Int. Cl.[2] ..... D21F 11/00

[52] U.S. Cl. ..... 162/135; 162/169; 162/181 A; 162/198; 427/411

[57] ABSTRACT

Plastic coated sized paperboard, used in the manufacture of leak proof containers for liquids, is provided with a coating of a water-soluble calcium salt disposed between the sized paperboard and the plastic coating. In testing formed containers for defects in the plastic coating by means of a dye solution containing a wetting agent, the coated paperboard of this invention provides for a more positive determination of the nature and size of any defect indicated than heretofore since the calcium ion present in the coating imparts good resistance to excessive penetration and spreading of the dye solution.

6 Claims, No Sheets Drawing,

6 Pages Specification

The file of this unexamined application may be inspected and copies thereof may be purchased (849 O.G. 1221, Apr. 9, 1968).